United States Patent Office 3,825,565
Patented July 23, 1974

3,825,565
3α-HYDROXY-Δ⁴-STEROIDS OF THE PREGNANE SERIES AND ESTERS THEREOF
Gordon Ian Gregory, Buckinghamshire, and Niall Galbraith Weir, London, England, assignors to Glaxo Laboratories Limited, Middlesex, England
No Drawing. Filed Nov. 2, 1971, Ser. No. 194,918
Int. Cl. C07c *169/32*
U.S. Cl. 260—397.4          10 Claims

ABSTRACT OF THE DISCLOSURE

3α - Hydroxy-Δ⁴-steroids and 3α-esters thereof having an acetyl group in the β-configuration and a hydrogen atom in the α-configuration at the 17-position and either two hydrogen atoms or a keto group at the 11-position. The disclosed compounds with carriers or excipients to provide compositions having marked anaesthetic properties.

---

This invention is concerned with improvements in or relating to compounds of the pregnane series having useful anaesthetic activity.

It has long been known that a number of steroids give rise to profound depression of the central nervous system and act pharmacodynamically as anaesthetics or hypnotics. Such compounds have been the subject of considerable study in an attempt to find anaesthetics to replace such substances as thiopentone sodium, normally used but well known to be accompanied by some degree of hazard and disadvantage. The literature shows that very many steroid compounds have been studied in this regard. Reviews and discussions of some of the work carried out are to be found, for example, in "Methods in Hormone Research" (Edited by Ralph I. Dorfman, Vol. III, Part A, Academic Press London and New York 1964, pages 415–475); H. Witzel, Z. Vitamin Hormon-Fermentforsch 1959, *10*, 46–74; H. Selye, Endocrinology, 1942, *30*, 437–453; S. K. Figdor et al., J. Pharmacol. Exptl. Therap., 1957, *119*, 299–309 and Atkinson et al., J. Med. Chem. 1965 *8*, 426–432.

A thorough review of the literature indicates that anaesthetic steroids generally possess poor activity and/or long induction periods. With such compounds a variety of undesired side effects such as paraesthesia and vein damage have also been noted. Steroids possessing anaesthetic activity hitherto described are generally relatively simple pregnane derivatives, often hydroxylated in the 3-position, the general trend having been in the latter case to study 3β-hydroxy compounds in preference to 3α-hydroxy compounds.

We have now found that certain compounds of the pregnane series which possess inter alia a 3α-hydroxy-Δ⁴-structure and which are more particularly described hereinafter have remarkable anaesthetic properties.

The aforesaid 3α-hydroxy-Δ⁴-pregnanes may be generally characterised as being steroids of the pregnane series having anaesthetic properties and further characterised by possessing a hydroxy group in the α-configuration at the 3-position, an acetyl group in the β-configuration at the 17-position, a hydrogen atom in the α-configuration at the 17-position, a double bond between the 4- and 5-positions and either two hydrogen atoms or an oxo group at the 11-position.

The expression "pregnane series" as used herein includes not only compounds of the conventional pregnane ring structure but also the corresponding 19-nor compounds, the presence or absence of a methyl group at the 10-position having little influence on anaesthetic properties.

The above-defined 3α-hydroxy-Δ⁴-pregnane anaesthetics have been found to induce anaesthesia and generally short induction periods, the anaesthetic action at suitable doses being generally instantaneous; the compounds are thus excellent anaesthetics for inducing anaesthesia which is to be maintained e.g. by an inhalation anaesthetic such as ether, halothane, nitrous oxide, trichloroethylene etc. The compounds are however capable of maintaining anaesthia and analgesia to a sufficient degree to enable various surgical operations to be conducted without the aid of an inhalation anaesthetic, the required degree of anaesthesia being maintained if necessary by repeated administration (or even continuous administration). Moreover, the said anaesthetics in accordance with the invention in general give rise to minimal side-effects as compared with previously described steroidal anaesthetics.

The invention further includes 3α-esters of the above defined 3α-hydroxy-Δ⁴-pregnane compounds, particularly lower alkanoyl esters, for example, containing in the alkanoyl group up to 5 carbon atoms. Such esters may also be esters containing one or more substituents in the alkanoyl portion e.g. halogen atoms, carboxy groups etc. Generally the induction period with a 3-ester is longer than that with the corresponding 3α-hydroxy compound. Both the 3α-hydroxy compounds and the corresponding 3-esters may be regarded as central nervous system depressants and thus in suitable dose may also be used as hypnotics or sedatives.

The above-defined 3α-hydroxy-Δ⁴-pregnane compounds and the corresponding 3α-esters are hereinafter collectively referred to as 3α-oxygenated-Δ⁴-pregnane anaesthetics.

The 3α-oxygenated-Δ⁴pregnane anaesthetics may conatin further substitution, for example at the 2β- and/or 16-position; it being understood that substitution by groups conferring a different physiological action is excluded. Examples of further substituents which may be present as above referred to, include alkyl groups, and especially lower alkyl groups, such as a methyl group at the 16-position or such an alkyl group or a lower alkoxy, e.g. methoxy, group or halogen atom, e.g. chlorine or bromine, at the 2β-position.

The above defined 3α - oxygenated - Δ⁴ - pregnane anaesthetics may be formulated as convenient, following generally known pharmaceutical practices, with the aid of one or more pharmaceutical carriers or excipients. By the term "pharmaceutical" as used herein we include applications to both human and veterinary medicine. For anaesthetic purposes, the steroids will be given by injection and thus one aspect of this invention comprises an anaesthetics composition for parenteral administration comprising a 3α-oxygenated-Δ⁴-pregnane anaesthetic as above-defined in a parenterally acceptable vehicle.

The above-defined 3α-oxygenated-Δ⁴-pregnane anaesthetics are new compounds. A radio active compound of this type, 3α-hydroxypregn-4-en-20-one, labelled with ¹⁴C or ³H isotope has been described ("Steroids," 1970, page 589), but it will be understood that this invention is concerned only with compounds in which the atoms present in the molecule are in their normal isotopic abundance, so that the product is not significantly radioactive.

Particularly useful anaesthetic compounds in accordance with the invention are those represented by the formula:

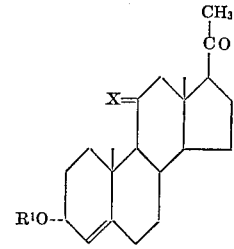

I where $R^1$ is a hydrogen atom or an acyl group, for example of the kind hereinbefore referred to, and X represents two hydrogen atoms or an oxo group.

Generally the 11-oxo compounds possess better anaesthetic properties in terms of induction time and/or degree of action than the corresponding 11-unsubstituted compound.

A particularly preferred compound according to the invention by virtue of its excellent anaesthetic properties and short induction period is 3α-hydroxypregn-4-ene-11,20-dione.

Many of the above-described 3α-oxygenated-Δ⁴-pregnane anaesthetics are pooorly soluble in water. We have found however that they may be formulated for parenteral administration in an aqueous solution of a parenterally acceptable non-ionic surface active agent.

The non-ionic surface active agents used for the purpose of this invention are generally those of the water soluble type, conveniently having an HLB value of at least 9, preferably at least about 12, advantageously at least about 13. Preferably the HLB value of the surface active agent is not greater than about 15 although it may, for example, be as high as 18. The surface active agent must naturally be one which is physiologically compatible, i.e. of itself give rise to no physiologically unacceptable side effects in the dosages employed in the intended species to be treated (man or animal). Surface active agents for use in accordance with the invention are for example to be found among the following non-ionic surfactants and classes of surfactants: Polyoxyethylated derivatives of fatty (C 12–C 20) glyceride oils, e.g. castor oil, containing from 35 to 45 oxyethylene groups, per mole of fatty oil. Polyoxyethylene ethers (containing from 10 to 30 polyoxyethylene groups) of long chain alcohols (containing for example from 12–18 carbon atoms).

Polyoxyethylene - polyoxypropylene ethers containing from 15 to 35 and from 15 to 30 oxyethylene and oxypropylene groups respectively. Polyoxyethylene ethers (containing from 6 to 12 oxyethylene groups) of alkyl phenols the alkyl groups of which preferably contain 6–10 carbon atoms.

Polyoxyethylated (containing from 15 to 30 oxyethylene groups) fatty acid (e.g. C 12–18) esters of sugar alcohol anhydrides, e.g. sorbitan or mannitan. Long-chain (e.g. C 10–16) alkanoyl mono- and di-alkanolamides (the alkanol portions of which for example contain 1–5 carbon atoms) for example lauroyl mono- and di-ethanolamides. Polyethylene glycol esters (containing from 6 to 40 ethylene oxide units) of long chain fatty acids (containing for example 12–18 carbon atoms) e.g. polyethyleneglycol mono-oleate (containing for example 8 ethylene oxide units).

Examples of non-ionic surface active agents, of the foregoing types, useful in accordance with the invention include:

Cremophor EL, a polyoxyethylated castor oil containing about 40 ethyleneoxide units per triglyceride unit;

Tween 80, polyoxyethylene sorbitan monooleate containing about 20 ethylene oxide units;

Tween 60, polyoxyethylene sorbitan monostearate containing about 20 ethylene oxide units; and Tween 40, polyoxyethylene sorbitan monopalmitate containing about 20 ethylene oxide units.

The expression "solution" is used herein to denote liquids which have the appearance of true solutions and are thus optically clear and capable of passage, for example, through a micro-porous filter, irrespective of whether such solutions are true solutions in the classical chemical sense and irrespective of whether they are stable or metastable. Thus it may be that the steroid is associated with micelles. The solutions of this invention, irrespective of their precise physical nature, behave as true solutions for the practical purposes of intravenous injection.

The proportion of surface active agent to be used in the compositions of this invention depends upon its nature and upon the concentration of steroid desired in the final composition.

In preferred compositions according to the invention the proportion of surfactant is preferably at least 5% by weight and advantageously above 10% by weight. A very convenient proportion of surfactant has been found to be 20% by weight but 30% and up to 50% may be used. The proportions of surfactant are expressed by weight in relation to the total volume of the composition.

As will be clear, the proportion of steroid which is dissolved in the aqueous solution according to the invention depends upon the nature and amount of surface active agent used. The composition will generally contain at least 1 mg./ml. of steroid and solutions can be made containing for example up to 7 mg./ml. of steroid or even 10 mg./ml.

In one method of preparing the solutions according to the invention the steroid is first dissolved in the selected surfactant for example, with heating and the resulting solution dissolved in water. Alternatively the steroid may be dissolved in a volatile organic solvent advantageously having a boiling point of less than about 80° C. which is miscible with the surface active agent such as a volatile lower aliphatic ketone, e.g. acetone or methyl ethyl ketone or a volatile halogenated hydrocarbon, e.g. chloroform or methylene chloride. The surface active agent is then added to this solution, the organic solvent removed by evaporation, for example by passing a stream of an inert gas through the solution, e.g. nitrogen and the resulting solution of steroid in surfactant is mixed with water.

The solutions may also be prepared by shaking the steroid with an aqueous solution of the surface active agent.

In all cases simple tests enable one to determine the relative proportions of surface active agent required.

The anaesthetic solutions according to the invention are generally administered by intravenous injection although as is known in the anaesthetic art in certain cases, e.g. with young children, intramuscular injection might be preferred.

As is usual in the case of anaesthetics, the quantity of steroid used to induce anaesthesia depends upon the weight of the individual to be anaesthetised. For intravenous administration in the average man a dose of from 0.45 to 3.5 mg./kg. will in general be found to be satisfactory to induce anaesthesia, the preferred dose being within the range of from 0.7 to 2.5 mg./kg. Generally a dose of about 1.35 mg./kg. is very satisfactory. The dose will naturally vary to some extent dependent upon the physical condition of the patient, and the degree and period of anaesthesia required, all as is well known in the art. It is thus possible by adjustment of the dose to achieve durations of anaesthesia varying from about 10 minutes by to an hour or more. If it is desired to maintain prolonged anaesthesia, repeated doses of the solutions of this invention may be used, such repeated doses being generally either of the same order or lower than the original dose. Alternatively continuous administration may be undertaken at for example a rate of 0.09–1.8 mg./kg./Min.

Where the anaesthetic solutions are administered intramusicularly, higher doses are generally necessary.

We have found that the above-described 3α-oxygenated-Δ⁴-pregnane anaesthetics are conveniently prepared by nucleophilic displacement of the 3β-substituent in a corresponding 3β-steroid.

The 3β-substituent in the 3β-steroid used in this process should be one capable of nucleophilic displacement by a hydroxyl group or acyloxy group and thus the 3β-steroid will contain at the 3-position an allylically replaceable substituent in the β-configuration such as a 3β-hydroxy group, an ether, carboxylic ester or sulphonyloxy ester of such a 3β-hydroxy group or a halogen atom (e.g. chlorine or bromine). Esters of the 3β-hydroxy group are conveniently acyl or sulphonyl esters, the acyl esters generally containing at least one electron-withdrawing substituent whereby displacement of the acyloxy group is facilitated. Acids which may be used for the preparation of such allylic acyl esters are preferably α-substituted acetic acids or nuclear substituted benzoic acids, in each case at least one substituent being electron-withdrawing. Specific examples of suitable acids include haloacetic acids, methoxyacetic acid, alkylthioacetic acids, cyanoacetic acid, glyoxylic acid, phenylglyoxylic acid, substituted phenylglyoxylic acids e.g. substituted by one or more halogen atoms (F, Cl, Br or I), methoxy groups or methyl groups or benzoic acids substituted by 4-methyl, 2- or 3-chloro or bromo, 2-, 3- or 4-nitro, or 3,5-di-nitro, 2-, 3- or 4-trifluoromethyl, 2-carbamoyl, 2-, 3- or 4-esterified carboxyl or 4-cyano substituents.

3β-Sulphonyloxy steroids which may be used for preparing the 3α-hydroxy compounds according to the invention are conveniently esters of alkyl or aryl sulphonic acids. Methane sulphonic acid and p-toluene-sulphonic acid are preferred sulphonic acids.

The preferred 3β-substituent for use in the hydrolysis reaction is a 3β-dichloroacetoxy group.

For the preparation of 3α-hydroxy compounds, generally the displacement reaction will be hydrolysis reaction and may be conveniently effected in aqueous solution, preferably at a pH of from 4 to 8, advantageously at a pH of about 5. In order generally to improve the solubility of the steroids present in the reaction medium, a water miscible organic solvent may be used, e.g. acetone or tetrahydrofuran.

The reaction mixture may be buffered to maintain the pH thereof within the desired limits, preferred buffer systems including known phosphate, borate, acetate and formate buffer systems.

Instead of using a buffer system, adjustment of the pH from time to time with a weak alkali, e.g. aqueous sodium bicarbonate may be used.

The hydrolysis may be effected at ambient temperature although elevated temperatures e.g. the reflux temperature of the reaction medium is generally preferable.

In another method of carrying out the desired hydrolysis employing a non-buffered system, the 3β-steroid is subjected to hydrolytic displacement in an aqueous solution of a strongly polar organic solvent, e.g. dimethyl formamide, dimethyl acetamide or N-methyl pyrrolidine. This reaction is advanetageously effected at elevated temperatures e.g. between 75° C. and the reflux temperature of the solvent used.

The 3α-hydroxypregn-4-enes resulting from the above-described process may be purified in conventional manner, for example by chromatography or crystallisation.

In the case of 11-unsubstituted compounds the digitonin separation method of R. Schoenheimer and E. A. Evans, Jr. (*J. Biol. Chem.* 1936, *114*, 567 and *J. Amer. Chem. Soc.*, 1936, *58*, 182) for separating 3α- and 3β-hydroxy-cholest-4-enes, is useful for the separation of mixtures of 3α- and 3β-hydroxy-pregn-4-enes.

In this last-mentioned method the mixture is reacted with digitonin in aqueous ethanol. This results in the formation of an insoluble complex with the 3β-hydroxy compound leaving the 3α-hydroxy compound unchanged in solution thus enabling separation to be readily effected.

The 3α-acyloxy-Δ⁴-pregnane anaesthetics may be prepared from the corresponding 3α-hydroxypregn-4-enes by acylation for example, in known manner. Acylation under basic conditions is generally preferred in order to avoid undesired side reactions. The acylation is generally effected in a solvent, preferably an aprotic solvent, for example, halogenated hydrocarbons such as methylene chloride or chloroform.

The acylating agent may for example be the anhydride or a halide (preferably the chloride) of the corresponding carboxylic acid. In general, the acylation is effected in the presence of a tertiary organic base such as pyridine, 4-methyl-pyridine, or N-methyl-morpholine.

The 3α-acyloxy-Δ⁴-pregnane anaesthetics may also be prepared by direct displacement of a corresponding 3β-substituted steroid. Thus for example a corresponding 3β-hydrocarbonsulphonyloxypregn-4 - ene may be reacted with the appropriate carboxylic acid in solution in a solvent medium to yield the desired 3α-acyloxy compound. This reaction is preferably effected in the presence of alkali metal ions it being convenient to use the carboxylic aicd in the form of an alkali metal salt thereof e.g. the sodium or potassium salt. Suitable solvents include for example dimethylsulphoxide and N-alkylamide solvents, e.g. dimethylformamide and dimethylacetamide. Preferably the solvent is water miscible and contains water (for example up to 20%) which generally serves to accelerate the reaction. Advantageously the carboxylic acid is an aliphatic carboxylic acid, lower alkanoic acids being preferred, for example, formic acetic, propionic or butyric acids or an aromatic carboxylic acid e.g. benzoic acid. Preferred salts are the sodium and potassium salts. Generally favourable results are obtained by the use of potassium acetate. The solvent used may be the carboxylic acid itself or an anhydride thereof (provided that such acid or anhydride is liquid at the reaction temperature) alkali metal ions being provided by an alkali metal salt e.g. of the carboxylic acid.

The 2β-substituted compounds referred to above may be prepared from the corresponding 2α,3α-epoxy-5α-hydroxy compound, by first opening the epoxide ring in known manner by reaction with a compound of the formula R²H or a compound furnishing an anion R² and a cation followed, where a metal derivative of the 3α-hydroxy group is first formed, by treatment with a source of protons to regenerate the 3α-hydroxy group, and then dehydrating the product at the 4,5-positions while protecting the 3α-hydroxy group.

Thus, for example, 3α-hydroxy-2β-methoxy-pregn-4-en-20-one may be prepared from the corresponding 2α, 3α-epoxy-5α-hydroxy compound by acid-catalysed reaction with methanol (the acid may be sulphonic acid, or, generally, a Lewis acid); after protecting the 3α-hydroxy group as acetate, dehydration at for example −30 to +40° C. with, for example, thionylchloride in pyridine gives the Δ⁴ compound, which may then be hydrolysed (preferably under basic conditions, e.g. with KOH) to give the desired 3α-hydroxy compound.

The 3β-acyloxy-pregn-4-enes used as starting materials for the preparation of the 3α-hydroxy compounds according to the invention are themselves in general new, and may be prepared, for example, by acylation of the corresponding 3β-hydroxy-pregn-4-ene. The acylation is conveniently effected under conditions analogous to those desired above for the acylation of the corresponding 3α-hydroxy compounds.

3β-Sulphonyloxy esters may also be prepared in analogous manner by using for example a hydrocarbon sulphonylhalide e.g. p-toluene sulphonyl chloride or methane sulphonyl chloride. Tertiary amines such as pyridine, triethylamine N-alkylmorpholines may advantageously be present.

The 3β-hydroxypregn-4-enes is so far as they are not known may be prepared by conventional methods used in the preparation of analogous known compounds. Various such methods are illustrated in the Examples hereinafter.

The following Examples and Preparations are given by way of illustration only. All temperatures are in degrees Celsius, and all rotations were determine at about 1% w./v. concentration in chloroform unless stated otherwise. Preparative thin layer chromatography (T.L.C.) was carried out on silica gel. Petroleum refers to petroleum ethers (boiling point 60–80°).

EXAMPLE 1

3α-Hydroxypregn-4-ene-20-one (a) By the action of N,N-dimethylformamide on the 3β-dichloroacetate.—A solution of 3β-dichloroacetoxypregn- 4-en-20-one (500 mg.) in pure N,N-dimethylformamide (5 ml.) with water (0.25 ml.) was heated at 112° for 30 minutes. The mixture was diluted with water and extracted with ether. The extracts on evaporation *in vacuo* yielded a semi-crystalline solid (420 mg.). This material was found to be a mixture of the isomeric 3α- and 3β-alcohols and unsaturated material (main product) on examination by thin layer chromatography, (T.L.C.). The mixture of alcohols was separated from the unsaturated compound by preparative T.L.C. (2 plates developed with benzene then three times with benzene-ethylacetate 10:1).

The mixture of alcohols (135 mg.) was separated by further preparative T.L.C. (plate developed eight times with benzene-ethyl acetate 8:1). The material in the more polar band was isolated and crystallised from ether (containing some acetone)- petroleum to give title compound (35 mg.) as large needles m.p. 130–131° [α]$_D$ +222° (c, 0.8).

(b) By the action of pH5 acetate buffer on the 3β-dichloroacetate.—A solution of 3β-dichloroacetoxypregn-4-en-20-one (1.3 g.) in acetone (78 ml.) was treated with 0.1 M pH5 acetate buffer solution (26 ml.) and the solution refluxed for 15 minutes. Some (ca 20 ml.) of the acetone was removed *in vacuo* at ca 30° and the solution was diluted with water until crystallization started. The mixture was stored in the refrigerator for 1 hour. The crystalline material (265 mg.), isolated by filtration was found to be a mixture of the 3α- and 3β-alcohols on examination by T.L.C. The filtrate was diluted with a large volume of water and the aqueous mixture saturated with sodium chloride. Ether extraction yielded a crystalline solid (650 mg.) which was a mixture of the 3α- and 5α-alcohols on T.L.C. Separation of the 3α and 5α-alcohols by preparative T.L.C. (3 plates developed 3 times with benzene-ethyl acetate 10:1) followed by crystallisation of the material in the appropriate band from ether (containing some acetone)—petroleum gave title compound (247 mg.) as large needles m.p. 130–131, [α]$_D$ +225°.

(c) By the action of pH 5 acetate buffer on the 3β-dichloroacetate, using the digitonin separation method.—3β-Dichloroacetoxypregn-4-en-20-one (15.8 g.) was dissolved in acetone (960 ml.) and pH 5 acetate buffer (0.1 M, 320 ml.) was added. The solution was refluxed for 15 minutes, and then about 250 ml. of acetone was removed by evaporation, and water was added until crystallization started. The mixture was stored in a refrigerator for one hour, then the oil which had separated was extracted into ether. The ether extract was washed with water, dried over sodium sulphate and evaporated to an oil, which was purified by column chromatography on silica gel. The fractions containing a mixture of 3α-hydroxy- and 3β-hydroxy-pregn-4-en-20-one were combined and evaporated to give an oily solid (about 8 g.). The solid was dissolved in warm 95% ethanol and was treated with digitonin (16 g.) in warm 95% ethanol. The mixture was left to cool for two hours and then evaporated *in vacuo* at 35°. The resulting solid was continuously extracted with hot ether, and the extract was evaporated to give 3α-hydroxypregn-4-en-20-one (4.7 g.), m.p. 123–126°. The ether-insoluble residue was continuously extracted with hot toluene, containing about 1% v./v. of pyridine, and the extract was evaporated to give 3β-hydroxypregn-4-en-20-one (1.19 g.), m.p. 156–160°.

(d) The above 3β-dichloroacetate and/or the parent 3β-hydroxy compound were converted to the desired 3α-hydroxy compound in an analogous manner but using different solvents and buffers, as summarized in the following table.

| | Hydrolysis of 3β-dichloroacetoxy-pregn-4-en-20-one | | | | | | |
|---|---|---|---|---|---|---|---|
| Run | Weight starting ester, mg. | Solvent, ml. | Buffer,[1] ml. | pH[2] | Time[3] (mins.) | Temp.,[3] °C. | 3α—OH, percent Δ[4] |
| 1 | 50 | MeOH, 3 | Acetate, 1 | 5 | 10 | R | 6 |
| 2 | 50 | Acetone, 3 | do | 5 | 15 | R | 60 |
| 3 | 25 | MeOH, 1.5 | Formate, 0.5 | 5 | 10 | R | 7 |
| 4 | 25 | Acetone, 1.5 | do | 5 | 10 | R | 55 |
| 5 | 25 | Tetrahydrofuran, 1.5. | do | 5 | 10 | R | 50 |
| 6 | 50 | Acetone, 1 | Acetate, 1 | 6 | 180 | 40 | 50 |
| 7 | 25 | Acetone, 1.5 | K$_2$CO$_3$, 5 | 11 | 30 | R | 17 |
| 8 | 5 | Acetone, 0.3 | K$_2$CO$_5$, 5 | 11 | O.N. | R.T. | 7.5 |
| 9 | 5 | do | NaHCO$_3$, 5 | 8 | O.N. | R.T. | 38 |
| | Hydrolysis of 3β-hydroxypregn-4-en-20-one | | | | | | |
| 10 | | 10 Acetone 1 | Formate 0.5 | 5 | 360 O.N. | R R.T. | 2 |
| 11 | | 10 do | do | 3 | 360 | R | 15 |

[1] Made by taking 0.1 m. CH$_3$CO$_2$Na or 0.4 m. HCO$_2$Na to required pH with acetic or formic acid respectively.
[2] pH before dilution with solvent.
[3] R=Reflux; R.T.=Room temp; O.N.=Overnight.
[4] Approximate estimation by visual inspection of T.L.C. plates.
[5] Equal weight of base to steroid, then dilution with water until solution complete.

EXAMPLE 2

3α-Acetoxypregn-4-en-29-one

3α-Hydroxypregn-4-en-20-one (499 mg.), acetic anhydride (2 ml.), pyridine (2 ml.) and methylene chloride (5 ml.) were stirred at room temperature overnight. The solution was diluted with methylene chloride (100 ml.), washed with water dried over sodium sulphate and evaporated to an oil which was recrystallized from methanol to give title compound (221 mg.) as colourless plates, m.p. 97–100°, [α]$_D$ +272°. (Found; C, 77.2; H, 9.9; C$_{23}$H$_{34}$O$_3$ (358.5) requires C, 77.1; H, 9.6%.)

EXAMPLE 3

3α-Propionyloxypregn-4-en-20-one

3α-Hydroxypregn-4-en-20-one (499 mg.), pyridine (2 ml.) propionic anhydride (2 ml.) and methylene chloride (5 ml.) were stirred together at room temperature for 48 hours. The solvent was evaporated and more pyridine (2 ml.) and propionic anhydride (2 ml.) were added. The mixture was stirred at room temperature for 6 hours, then poured into ice-cold water and extracted with ether-ethyl acetate. The extract was washed with water, dried over sodium sulphate and evaporated to give a gum which was purified by preparative TLC on silica gel in ethyl acetate-petrol and recrystallization from methanol-ether to give title compound (284 mg.) as colourless crystals, m.p. 72–75°, [α]$_D$ +280°. Found: C, 77.1; H, 9.7. C$_{24}$H$_{36}$O$_3$ (372.53) requires C, 77.3; H, 9.7%.)

EXAMPLE 4

3α-Hydroxypregn-4-en-20-one-3-hemisuccinate

3α-Hydroxypregn-4-en-20-one (511 mg.) succinic anhydride (517 mg.) and pyridine (5 ml.) were stirred at room temperature for 4 days. The solution was poured into ice-water, neutralized with dilute hydrochloric acid and extracted with ether-ethyl acetate. The extract was washed with water, dried over sodium sulphate and evaporated to give a gum which was purified by preparative TLC on silica gel in butan-2-one:ethanol:0.880 ammonia::65:15:28 and recrystallization from aqueous methanol to give title compound (238 mg.) as colourless chunks, m.p. 124–126°, $[\alpha]_D$ +248° (Found: C, 71.6; H, 8.7. $C_{25}H_{36}O_5$ (416.54) requires C, 72.0; H, 8.7%).

EXAMPLE 5

3α-Acetoxypregn-4-ene-11,20-dione

3α-Hydroxypregn-4-ene-11,20-dione (599 mg.) in methylene chloride (5 ml.) was cooled to 0°, and pyridine (2 ml.) and acetic anhydride (2 ml.) were added. The reaction was stirred at room temperature for 24 hours, then diluted with methylene chloride, washed with water, dried over sodium sulphate and evaporated to give a yellow oil which was purified by preparative TLC on silica in ethyl acetate-petrol and recrystllization from ethyl acetate-petrol to give title compound (330 mg.) as long colourless needles, m.p. 98–99° $[\alpha]_D$ +334.5°. (Found: C, 74.0; H, 8.4. $C_{23}H_{32}O_4$ (372.49) requires C, 74.2; H, 8.67.)

EXAMPLE 6

3α-Propionyloxypregn-4-ene-11,20-dione

3α - Hydroxypregn - 4 - ene - 11,20-dione (391 mg.), pyridine (2 ml.) and propionic anhydride (2 ml.) were stirred at room temperature overnight, and then poured into water and extracted with ether. The ether extract was washed with water, and dried over sodium sulphate and evaporated to give a yellow gum which was recrystallised from methanol containing a drop of ether to give title compound (231 mg.) as pale yellow prisms, m.p. 43–45° C, $[\alpha]_D$ +310°. (Found: C, 74.3; H, 8.6 $C_{24}H_{34}O_4$ (386.51) requires C, 74.5; H, 8.85%.)

EXAMPLE 7

3α-Hydroxypregn-4-ene-11,20-dione-3-hemisuccinate

3α - Hydroxypregn - 4 - ene-11,20-dione (263 mg.) and succinic anhydride (283 mg.) in pyridine (5 ml.) were stirred at room temperature for 5 days. More succinic anhydride (217 mg.) was added, and the solution stirred for a further 6 days, and then poured into water, neutralised with dilute hydrochloric acid and extracted into ether. The ether extract was washed with water, dried over sodium sulphate and evaporated to an off-white gum which was purified by preparative TLC on silica in butan-2-one:ethanol::880 ammonia ::68:15:28 and recrystallisation from ether-methanol to give title compound (120 mg.) as pale brown chunks, m.p. 145–149°, $[\alpha]_D$ +218°. (Found C. 69.7; H, 7.8. $C_{26}H_{34}O_6$ (430.5) requires C, 69.8; H, 7.95%.)

EXAMPLE 8

3α-Chloroacetoxypregn-4-ene-11,20-dione

3α - Hydroxypregn - 4 - ene-11,20-dione (100 mg.) in methylene chloride ( 5 ml.) with pyridine (0.05 ml.) was treated with chloroacetyl chloride (0.05 ml.). The reaction mixture was stored for 1 hour at room temperature. The organic solution was washed with water until neutral, dried over sodium sulphate and evaporated in vacuo. The residue was recrystallised from ether/petrol (40–60°) to give title compound (101 mg.) as rods m.p. 107–108° $[\alpha]_D$ (c. 1.6)+334.5°. (Found C, 67.7; H, 7.7; Cl, 8.5. $C_{23}H_{31}ClO_4$ (406.94) requires C, 67.9; H, 7.7; Cl, 8.7%.)

EXAMPLE 9

3α-Hydroxypregn-4-ene-11,20-dione

A solution of 3β-dichloroacetoxy-pregn-4-ene - 11,20-dione (1.5 g.) in acetone (90 ml.) with 0.1 molar pH 5 acetate buffer (35 ml.) was refluxed for 1¼ hours. The solution was evaporated at room temperature until the products began to crystallise. The mixture was diluted with water, saturated with sodium chloride and extracted with ether. The ether extracts were washed thoroughly with water and evaporated in vacuo to give the crude product. Separation of this mixture by preparative T.L.C. (six 20 x 40 cm. plates; developed three times with benzene-ethyl acetate 3:1) gave title compound (475 mg.) Recrystallisation from ether (containing some acetone)-petroleum ether gave pure title compound (372 mg) as prisms m.p. 138–140°, $[\alpha]_D$ +261.8° (c, 0.7). (Found: C, 76.3; H, 9.0. $C_{21}H_{20}O_3$ (330.5) requires C, 76.3; H, 9.15%.) A second crop (43 mg.) of pure material also obtained.

EXAMPLE 10

3α-Hydroxy-2β-methoxypregn-4-en-20-one

3α - Acetoxy - 5α - hydroxy - 2β - methoxypregnan-20-one (3.5 g.) was dissolved in pyridine (28 m.) and cooled to 0°. Thionyl chloride (14 ml.) was added slowly and the reaction stirred at 0° for 10 minutes. It was then cautiously poured onto ice and steroid extracted with ether to give a mixture 3α-acetoxy-2β-methoxypregn-5-en-20-one and 3α-acetoxy-2β-methoxypregn-4-en-20-one (2.8 g.). The crude solid was dissolved in methanol (250 ml.) and potassium hydroxide (3 g.) dissolved in methanol (100 ml.) was added under nitrogen. The reaction was allowed to stand at room temperature for 1 hour, it was then poured into water and the excess potassium hydroxide neutralised with acetic acid and the steroid extracted with chloroform. Crystallisation from methyl acetate-petroleum ether b.p. 40–60° followed by recrystallisation from aqueous acetone give title compound m.p. 186–189°. $[\alpha]_D$ +143°

The following Preparations describe the preparation of intermediates used in preparing the compounds according to the invention.

PREPARATION 1.

3β-Dichloroacetoxypregn-4-en-20-one

A solution of 3β-hydroxypregn-4-en-20-one (Gut, J. Org. Chem., 1956, 21, 1327 (2.19 g., ca., 7 mmoles) in dry methylene chloride (27.0 ml.), was treated with dry pyridine (0.62 ml., ca. 7.6 mmoles) and dichloroacetyl chloride (0.74 ml. ca. 7.6 mmoles) at 0°. The mixture was kept at 0° for 2½ hours, the methylene chloride washed with water (till the washings were neutral), dried and evaporated in vacuo to give the crude ester (3.01 g.). This material was crystallised from ether-petroleum to give the dichloroacetate (2.1 g.) as prisms m.p. 122° $[\alpha]_D$ +47.7°. (c. 1.3 acetone) (Found: C, 64.9; H. 7.8; Cl, 16.6 $C_{23}H_{32}Cl_2O_3$ (427.4) requires C, 64.65; H, 7.55; Cl, 16.6%).

PREPARATION 2

3β-Hydroxypregn-4-ene-11,20-dione (a) 20,20 - Ethylenedioxypregn - 4 - en - 3,11 - dione.—11-Oxoprogesterone (8.8 g.) was dissolved in hot dry methanol (150 ml.) and to the hot solution was added pyrrolidine (2.2 ml.). The reaction mixture, on cooling slowly to 10°, deposited a pale orange crystalline precipitate. After two hours the precipitate was separated and dried over potassium hydroxide in vacuo to give 3-(pyrrolidin-1-yl) pregna-3,5-diene-11,20-dione (9.2 g.) as pale orange needles, m.p. 185–189° (decomp.).

The enamine was dissolved in dry ether (100 ml.) and dry chloroform (100 ml.), and dry hydrogen chloride was passed through the solution for 20 minutes. Water (150 ml.) was added, and the aqueous layer was separated, washed with ether, and evaporated to give a pale yellow oil which was dried in vacuo to give the eniminium chloride as an amorphous solid, which degenerated to a gum on standing.

The eniminium chloride was dissolved in dry ethylene glycol (250 ml.) with toluene-p-sulphonic acid (300 mg.), and the solution was slowly evaporated *in vacuo* for two hours. The remaining viscous solution was then poured into a solution of potassium carbonate (15 g.) in water (1 l.), and the off-white precipitate was filtered off and dried over potassium hydroxide *in vacuo* to give the title ketal 7.9 g. as a powdery white solid, m.p. 145–150°.

(b) 3β-Hydroxypregn-4-ene-11,20-dione.—20,20-Ethylenedioxy-3β-hydroxypregn-4-en-11-one (4.45 g.) was dissolved in alcohol (300 ml.), acetone (35 ml.) and water (35 ml.), and to the stirred solution was added pyruvic acid (50–60%, 10 ml.). The solution was stirred at room temperature for 72 hours, and it was then adjusted to pH 7 by the addition of 10% aqueous potassium bicarbonate solution. The mixture was evaporated to about 200 ml., and water (200 ml.) was added, and the precipitate was extracted into ether. Evaporation of the dried ether extract gave an off-white solid which was recrystallised from methanol to give title compound (3.77 g.) as colorless plates, m.p. 154–158°.

PREPARATION 3

3β-Hydroxypregn-4-ene-11,20-dione (a) 11α - Hydroxy-3-(pyrrolidin-1-yl) pregna-3,5-dien-20-one.—A solution of 11α-hydroxypregn-4-ene-3,20-dione (11.0 g., 0.3 mole) in hot methanol (200 ml.) was treated (under nitrogen with vigorous stirring) with pyrrolidine (2.7 g., 3.17 ml., 0.85 mole). The solution was allowed to cool slowly to room temperature. After *ca* 2 hours at room temperature the mixture was filtered to give the *enamine* (10.13 g.) as pale yellow needles m.p. 165–168° decomp $[\alpha]_D$ −114.3° (*c*, 1.3) $\lambda_{max.}$ 240 and 273 nm. ($\epsilon$ 6,230 and 4,830) (Found: C, 77.5; H, 9.3; N, 3.3. $C_{25}H_{37}O_2N$ (383.6) requires C, 78.3; H, 9.7; N, 3.65%).

(b) 20,20-Ethylenedioxy - 11α - hydroxypregn-4-en-3-one.—Dry hydrogen chloride was bubbled through a solution of 11α-hydroxy-3-((pyrrolidin-1-yl)pregna-3,5-dien-20-one (9.85 g.) in dry ether (100 ml.) with dry chloroform (100 ml.) for 15 minutes. The mixture was treated with water (150 ml.) and the aqueous phase washed with further quantities of ether. The aqueous solution was freeze dried to give the *eniminium chloride* as an amorphous solid (degenerated to a gum on standing) $\lambda_{max.}$ 277 nm. ($\epsilon$ 19,280).

A solution of the above compound in benzene (200 ml.) with ethylene glycol (65 ml.) was distilled at normal pressure. After *ca* 100 ml. benzene had been removed a further volume (150 ml.) was added with anhydrous toluene-p-sulphonic acid (300 ml.). The mixture was refluxed for 20 hours, water being collected in a Dean-Stark separator. The benzene was removed *in vacuo* and the residue diluted with water (500 ml.) containing potassium carbonate (15 g.). The mixture was stirred at room temperature for 1½ hours and the crude product isolated by filtration. This material (8.0 g., after air drying) in chloroform-ether (1:1, 100 ml.) was filtered through a short column of grade IV basic alumina (to remove polar impurities). Removal of the solvent *in vacuo* and crystallisation of the residue twice from acetone gave the ketal (5.0 g.) as rods m.p. 195–197, $[\alpha]_D$ +89.7° (c. 1.2) $\delta_{max.}$ 240 nm. ($\epsilon$ 15,470) (Found: C, 73.6; H, 9.2; $C_{23}H_{34}O_4$ (374.5) requires C, 73.75; H, 9.15%).

(c) 20,20 - Ethylenedioxypregn-4-ene-3,11-dione.—A solution of 20,20-ethylenedioxy-11α-hydroxypregn-4-en-3-one (4.5 g.) in dry pyridine (25 ml.) was added to a mixture of chromium trioxide (4.5 g.) in pyridine (35 ml.). After 2 hours at room temperature the mixture was treated with methanol (20 ml.) and after a further 30 minutes the solvents were removed *in vacuo* at ca 50°. The residual powder was extracted thoroughly with ether. The ether solution was filtered through some Kieselguhr and evaporated *in vacuo* to give the ketone (4.17 g.) as needles. Crystallisation of a portion (200 mg.) from acetone-petroleum gave pure title compound (136 mg.) as fine needles m.p. 153–156° decomp., $[\alpha]_D$ +206° $\lambda_{max.}$ 236 nm. ($\epsilon$ 15,460) (Found: C, 73.6; H, 8.6: $C_{23}H_{32}O_4$ (372.5) requires C, 74.15; H, 8.65%).

PREPARATION 4

3β-Hydroxypregn-4-ene-11,20-dione

A solution of 20,20-ethylenedioxypregn-4-ene-3,11-dione (3.75 g., *ca* 10 mmoles) in dry methanol (260 ml.) was treated at room temperature with sodium borohydride (0.385 g., *ca* 11 mmoles). The sodium borohydride was added in six portions (with vigorous stirring of the mixture) over a period of 1 hour. After a further 40 minutes at room temperature the solution was carefully diluted with water (to ensure crystallisation) and the product isolated by filtration. This material was washed with water and dried *in vacuo* to give the 3β-alcohol (3.26 g.) as platelets m.p. 144–146° $[\alpha]_D$ +115.8° (*c*, 1.1) (Found: C, 73.5; H, 9.0; $C_{23}H_{34}O_4$ (374.5) requires C, 73.75; H, 9.15%).

The above compound (3.1 g.) was dissolved in a 0.08% solution of oxalic acid in ethanol (200 ml.) and the solution stored at room temperature for 4½ days. T.L.C. examination after this period indicated incomplete hydrolysis. The mixture was treated with water (1 ml.) and kept at 40° for 18½ hours. The solution was taken to pH 7 with ammonium hydroxide and the ethanol removed *in vacuo*. The residue was partitioned between water and ether and the aqueous phase washed with further amounts of ether and ethyl acetate. The combined organic extracts were washed with water and dried and evaporated *in vacuo*. The residual solid (2.9 g.) was crystallised from acetone-petroleum to give title compound (1.93 g.) as prisms m.p. 156–158°, $[\alpha]_D$ +191° (*c*, 0.7) (Found: C, 76.1; H, 9.4. $C_{21}H_{30}O_3$ (330.5) requires C, 76.3; H, 9.15%).

PREPARATION 5

3β-Dichloroacetoxypregn-4-ene-11,20 dione

A solution of 3β - hydroxypregn - 4 - ene - 11,20 - dione (165 g., 5 mmoles) in dry methylene chloride (20 ml.) at 0° was treated with dry pyridine (0.45 ml., 5.5 mmoles) and dichloroacetyl chloride (0.53 ml., 5.5 mmoles) and the mixture stored at room teperature for *ca* 1 hour. The organic solution (further 100 ml. methylene chloride added) was washed with water until neutral and dried and evaporated *in vacuo*. The residue (2.2 g.) was crystallised from ether (containing some acetone)-petroleum to give the *dichloroacetate* (1.65 g.) as platelets m.p. 130–131°, $[\alpha]_D$ +99° (c, 0.8).

PREPARATION 6

3α,5α-Dihydroxy-2β-methoxypregnan-20-one

2α,3α-Epoxy-5α-hydroxypregnan - 20 - one (500 mg.) was dissolved in dry methanol (50 ml.) and concentrated sulphuric acid (0.1 ml.) was added. The reaction was stirred for 15 minutes at room temperature, poured into aqueous sodium bicarbonate and extracted with chloroform. Crystallisation from methyl acetate-petroleum ether gave title compound (380 mg.), m.p. 182–184°, $[\alpha]_D$ +80° (Found: C, 70.6; H, 10.1. $C_{22}H_{36}O_4\cdot\frac{1}{2}H_2O$ requires C, 70.7; H, 10.4%).

PREPARATION 7

3α-Acetoxy-5α-hydroxy-2β-methoxypregnan-20-one

3α,5α-Dihydroxy - 2 β- methoxypregnan-20-one (1.3 g.) was dissolved in pyridine (20 ml.) and acetic anhydride (10 ml.) was added; the reaction was allowed to stand at room temperature for 21 hours, poured into iced 2N hydrochloric acid an the white solid filtered off, washed with water and dried (980 mg.). Crystallisation from aqueous methanol gave title compound, m.p. 168–171°, $[\alpha]_D$ +72° (Found: C, 70.9; H, 9.6. $C_{24}H_{38}O_5$ requires C, 70.9; H, 9.4%).

The following are Examples of compositions according to the invention

EXAMPLE 11

0.066 g. of 3α-hydroxypregn-4-ene-11,20-dione were dissolved in 4 ml. of acetone of 20° and the resulting solution added to 2 g. of Cremophor EL at 20° and stirred until homogeneous. The acetone was removed by a vigorous stream of nitrogen and the resulting solution was diluted with a sterile distilled water containing 0.050 g. of sodium chloride to give a final volume of 10 ml.

EXAMPLE 12

0.033 g. of 3α-hydroxypregn-4-en-20-one were dissolved in 4 ml. of acetone at 20° and the resulting solution added to 2 g. of Cremophor EL at 20° and stirred until homogeneous. The acetone was removed by a vigorous stream of nitrogen and the resulting solution was diluted with sterile distilled water containing 0.050 g. of sodium chloride to give a final volume of 10 ml.

What is claimed is:

1. A steroid of the pregnane series having the general formula

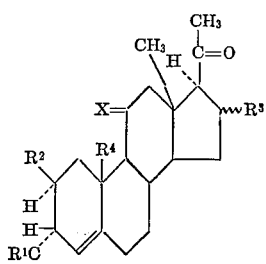

wherein:

$R^1$ is hydrogen, lower alkanoyl, or lower alkanoyl substituted by one or more halogen atoms or carboxy groups;

$R^2$ is hydrogen, lower alkoxy or halogen;

$R^3$ is hydrogen or lower alkyl;

$R^4$ is hydrogen or methyl; and

X is oxygen or two hydrogen atoms; provided that $R^2$ and X are not both hydrogen.

2. A steroid as claimed in claim 1 wherein X represents an oxo group.

3. A steroid as claimed in claim 1 which is a 3α- alkanoyl ester containing up to 5 carbon atoms in the alkanoyl group.

4. A steroid as claimed in claim 3 wherein the alkanoyl group carries a halogen atom or carboxy group substituent.

5. A steroid as claimed in claim 1 which is 3α-hydroxypregn-4-ene-11,20-dione.

6. A steroid as claimed in claim 1 which is 3α-acetoxypregn-4-ene-11,20-dione.

7. A steroid as claimed in claim 1 which is 3α-propionyloxypregn-4-ene-11,20-dione.

8. A steroid as claimed in claim 1 which is 3α-hydroxypregn-4-ene-11,20-dione-3-hemiscuccinate.

9. A steroid as claimed in claim 1 which is 3α-chloroacetoxypregn-4-ene-11,20-dione.

10. A steroid as claimed in claim 1 which is 3α-hydroxy-2β-methoxypregn-4-en-20-one.

OTHER REFERENCES

Seamark et al., "Steroids," 1970 vol. 15(4) p. 589–604, 1970, CA par. 12157b.

ELBERT L. ROBERTS, Primary Examiner

U.S. Cl. X.R.

424—243; 260—397.45, 239.55 C, 239.5, 239.55 R